UNITED STATES PATENT OFFICE.

NATHAN GRÜNSTEIN, OF FRANKFORT-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

MANUFACTURE OF ACETALDEHYDE.

1,184,177.  Specification of Letters Patent.  Patented May 23, 1916.

No Drawing.  Application filed July 16, 1914.  Serial No. 851,375.

*To all whom it may concern:*

Be it known that I, NATHAN GRÜNSTEIN, a subject of the Emperor of Russia, and resident of Frankfort-on-the-Main, Germany, have invented certain new and useful Improvements in the Manufacture of Acetaldehyde, of which the following is a specification.

Various processes have been proposed for the manufacture of acetaldehyde, by passing acetylene through heated acid mixed with mercuric, or mercurous, salts. From the results of investigations (see specification of United States Letters Patent 1044169) it was supposed that, for the successful carrying out of this process, the concentration of the acid and the temperature of the operation must bear a certain relation to each other and when the concentration of the acid was increased the temperature had to be correspondingly lowered while when the temperature was raised the concentration of the acid had to be correspondingly lowered. This view is confirmed by the fact that attempts to produce acetaldehyde by passing acetylene through boiling strongly concentrated sulfuric acid have been failures, whereas by passing acetylene through boiling highly diluted sulfuric acid, a good yield of acetaldehyde is readily obtained. Operating at high temperatures in which acetaldehyde of low boiling point formed by the passing of acetylene at once distils off from the solution, is considered desirable by those conversant with the manufacture because this mode of operating allows the process to be carried out in a continuous manner. According to the practice hitherto followed, the higher temperatures could only be resorted to if highly diluted acids were used, because it was feared that in using concentrated acid, undesirable condensation of the aldehyde would take place. Working with highly diluted acid has however the disadvantage that the mercury salt is quickly reduced to metallic mercury. For this reason with highly diluted acid and by carrying out the operation at a high temperature with a definite quantity of the mercury salt, it is not possible to produce more than a comparatively small quantity of acetaldehyde.

It has now been found that by working with concentrated acid and at high temperatures, acetaldehyde can be produced readily and a considerable saving of the mercury salt can be effected, if on the one hand the acetylene be passed continuously in excess through apparatus charged with concentrated acid and the temperature be kept so high that while a smooth continuous distilling off of the aldehyde formed takes place, ebullition is avoided. In working according to this process, the aldehyde formed is removed so quickly from the reaction liquid that undesirable condensation is avoided.

If the operation be, for instance, carried on in several apparatus in series, more acetylene passes through the reaction liquid than is absorbed by the liquid and the unabsorbed excess of acetylene entrains the acetaldehyde formed, and the acetaldehyde distils off continuously and, as it remains only a very short time in contact with the acid, there is no formation of resin. The acetylene containing aldehyde is deprived of aldehyde in special apparatus by condensation, or by washing. The acetylene unabsorbed in these apparatus is freed in the same manner from aldehyde and passed through the next apparatus and so forth. The apparatus may be so connected together that a greater, or lesser excess of acetylene can be passed through each of them.

The production of acetaldehyde is more troublesome if no excess of acetylene be passed through the reaction liquid. In this mode of operation the acetaldehyde formed does not completely distil off and accumulates in the solution of the mercury salt. The increasing partial pressure of the aldehyde in the reaction space however decreases greatly the rate, or energy, of the absorption of acetylene so that the aldehyde must be distilled off at short intervals of time and the process cannot be carried out in a continuous manner.

The following is an example of how this invention can be performed, but the invention is not limited to this example.

Example: The acetylene absorption apparatus is charged with a from 20, to 25 per cent. sulfuric acid admixed with the mercury salt and the aldehyde absorption apparatus is charged with water. The whole system is evacuated of air and filled up with acetylene whereupon, at from 50°, to 70°, centigrade acetylene is passed through. In some cases higher temperatures are allowable. Heating up to the boiling point of the acid or approaching it, is to be avoided as this would cause disturbances, especially an abundant evolution of steam, resinification, and the like. The pressure of the acetylene is so adjusted that the acetylene passes through the whole of the apparatus. The last portion of the apparatus is preferably provided with a hydraulic seal so that no acetylene escapes.

In this mode of operation the liquid is stirred in the various apparatus by the acetylene; an intensive formation of aldehyde takes place continuously and the unabsorbed acetylene conducts the aldehyde into the aldehyde absorption apparatus.

The direction of the acetylene current, when a series of apparatus is used, is advantageously reversed periodically, so that the whole of the acetylene is introduced first at one end of the apparatus and then at the other. The aldehyde content of the last apparatus is thus made more uniform, and the end apparatus are in turn treated with the acetylene in excess in a fresh condition, and with the acetylene after it has already passed through the other apparatus. In this manner, the whole of the plant is treated in a uniform manner. A similar result is obtained when the acetylene deprived of aldehyde, is returned, not into the next portion of the apparatus but into the same portion. Owing to the large excess of acetylene, the solution is so briskly stirred that, in some cases, a mechanical agitator can be dispensed with.

The concentration of the acid can be still further increased from that referred to above, as in this mode of operation, the aldehyde is in contact with the acid for such a short time, that, as has been ascertained, no perceptible condensation of aldehyde takes place. The yield of aldehyde is practically theoretical.

Of special importance for the industrial carrying out of the process is the fact that by using concentrated acids the mercury salt is reduced but slowly to metallic mercury. It is therefore possible, with the same amount of the mercury salt, and without regenerating it, to produce more aldehyde than is obtained when employing dilute acid in manufacturing aldehyde.

In lieu of sulfuric acid, other acids of higher concentration may be used, for instance a 30 to 35 per cent. phosphoric acid, organic sulfo acids and the like. The mercury salt, partly reduced to metallic mercury, is either regenerated, or replaced by fresh salt. The acid which after long use, has become useless is purified and returned to the process. The aldehyde is obtained in a pure condition from the aqueous solution by fractional distillation. Instead of water other liquid which will dissolve aldehyde readily, such as naphtha, may be used.

I claim:—

1. The process of producing acetaldehyde from acetylene which comprises passing acetylene in excess continuously through a relatively concentrated acid containing a mercury compound at a high temperature sufficient to distil off the aldehyde formed but below the boiling point of the acid.

2. The process of producing acetaldehyde from acetylene which comprises passing acetylene in excess continuously through a relatively concentrated acid containing a mercury compound at a temperature of about 50 to 70° C.

3. The process of producing acetaldehyde from acetylene which comprises passing acetylene in excess continuously through an acid of about 20 to 35% strength containing a mercury compound at a high temperature sufficient to distil off the aldehyde formed but below the boiling point of the acid.

4. The process of producing acetaldehyde from acetylene which comprises passing acetylene in excess continuously through sulfuric acid of about 20 to 25% strength containing a mercury compound at a high temperature sufficient to distil off the aldehyde formed but below the boiling point of the acid.

5. The process of producing acetaldehyde from acetylene which comprises passing acetylene in excess continuously through an acid of about 20 to 35% strength containing a mercury compound at a temperature of about 50 to 70° C.

6. The process of producing acetaldehyde from acetylene which comprises passing acetylene in excess continuously through sulfuric acid of about 20 to 25% strength containing a mercury compound at a temperature of about 50 to 70° C.

In testimony whereof I have signed my name to this specification in the presence of two subscribing witnesses.

NATHAN GRÜNSTEIN.

Witnesses:
 JEAN GRUND,
 CARL GRUND.